US009522693B2

United States Patent
Tomaru et al.

(10) Patent No.: US 9,522,693 B2
(45) Date of Patent: Dec. 20, 2016

(54) STEERING DEVICE (71) Applicant: NSK Ltd., Shinagawa-ku, Tokyo (JP)

(72) Inventors: Yuuichi Tomaru, Maebashi (JP); Noritomo Narita, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 15/100,350

(22) PCT Filed: Feb. 10, 2015

(86) PCT No.: PCT/JP2015/000613
§ 371 (c)(1),
(2) Date: May 31, 2016

(87) PCT Pub. No.: WO2015/122179
PCT Pub. Date: Aug. 20, 2015

(65) Prior Publication Data
US 2016/0297463 A1    Oct. 13, 2016

(30) Foreign Application Priority Data

Feb. 12, 2014 (JP) .................................. 2014-024615
Oct. 17, 2014 (JP) .................................. 2014-212568

(51) Int. Cl.
*B62D 1/16* (2006.01)
*B62D 1/184* (2006.01)
(Continued)

(52) U.S. Cl.
CPC ............... *B62D 1/184* (2013.01); *B62D 1/187* (2013.01); *F16B 2/185* (2013.01)

(58) Field of Classification Search
USPC .................... 74/492, 493, 495; 280/775, 777
See application file for complete search history.

(56) References Cited

U.S. PATENT DOCUMENTS 5,527,068 A * 6/1996 Schneider ............. B62D 1/184
                                                     280/775
5,787,759 A * 8/1998 Olgren .................. B62D 1/184
                                                     280/777
(Continued)

FOREIGN PATENT DOCUMENTS

JP       59-28717 U      2/1984
JP       2005-28973 A    2/2005
(Continued)

OTHER PUBLICATIONS

International Search Report (PCT/ISA/210) issued in PCT Application No. PCT/JP2015/000613 dated May 19, 2015 with English translation (5 pages).
(Continued)

*Primary Examiner* — Toan To
(74) *Attorney, Agent, or Firm* — Crowell & Moring LLP (57) ABSTRACT

To provide a steering device that reduces a hitting sound occurring upon release of clamping by a clamp mechanism and has high operability. A steering device including a clamp mechanism including: a shaft rod bridged across a vehicle-body attachment bracket supporting a steering column; a fixed cam member and a movable cam member configured to cause mutually opposing cam protrusions to be engaged with each other, and axially move the shaft rod in cooperation with each other; and an operation lever for moving the movable cam member. A buffer member is provided between first stopper portions of the fixed cam member and second stopper portions of the movable cam member.

8 Claims, 9 Drawing Sheets

(51) Int. Cl.
 B62D 1/187 (2006.01)
 F16B 2/18 (2006.01)

(56) References Cited

U.S. PATENT DOCUMENTS

| | | | |
|---|---|---|---|
| 9,393,986 B1* | 7/2016 | Anspaugh | B62D 1/184 |
| 2005/0178231 A1* | 8/2005 | Schick | B62D 1/184 |
| | | | 74/493 |
| 2009/0114056 A1* | 5/2009 | Nashef | B62D 1/184 |
| | | | 74/493 |
| 2010/0139439 A1* | 6/2010 | Uesaka | B62D 1/184 |
| | | | 74/493 |
| 2013/0160598 A1* | 6/2013 | Hirooka | B62D 1/184 |
| | | | 74/495 |
| 2015/0053041 A1* | 2/2015 | Schnitzer | F16F 7/06 |
| | | | 74/493 |
| 2015/0375770 A1* | 12/2015 | Buzzard | B62D 1/184 |
| | | | 74/493 |

FOREIGN PATENT DOCUMENTS

| | | |
|---|---|---|
| JP | 2006-51876 A | 2/2006 |
| JP | 2008-307959 A | 12/2008 |
| JP | 2010-126031 A | 6/2010 |

OTHER PUBLICATIONS

Japanese-language Written Opinion (PCT/ISA/237) issued in PCT Application No. PCT/JP2015/000613 dated May 19, 2015 with English translation (12 pages).

Japanese-language Decision to Grant a Patent issued in counterpart Japanese Application No. 2015-562741 dated May 10, 2016 with English translation (4 pages).

\* cited by examiner

STEERING DEVICE

TECHNICAL FIELD

The present invention relates to a steering device, more particularly to a steering device that can adjust a tilt position of a steering wheel according to the physical size and driving posture of a driver by supporting a steering column by a clamp mechanism using cams in a vehicle-body attachment bracket.

BACKGROUND ART

As such a type of steering device, a tilt fixing device for a tilt type steering column has been proposed that includes, for example, a tilt bolt that is inserted from a tilt bracket to a tilt lever and whose screw portion at one end thereof is screwed with a nut and a pair of a fixed cam member and a movable cam member that are provided on a side of the tilt bolt opposite to the nut, whose respective facing cam protrusions are engaged with each other, and whose respective bosses on back surfaces thereof are each engaged with the tilt bracket and the tilt lever, in which a clamping force is generated between the tilt bolt and the nut by operation of the tilt lever to lock and unlock the steering column.

The cam protrusions of the fixed cam member and the movable cam member each include a flat cam surface and inclined cams continuing with a downward inclination in a circumferential direction from the flat cam surface. The movable cam member is rotated so that the mutual flat cam surfaces are abutted against and engaged with each other, whereby an axial force is applied to the tilt bolt to lock and unlock the steering column.

Herein, in such a tilt fixing device, when clamping of the clamp mechanism is released, the axial force in a clamping direction escapes and constituent components become in a free state. At that time, due to the own weight of the tilt lever and inertia of an operation force in a direction of the release, a stopper of the movable cam member forcefully hits against a stopper of the fixed cam member to make a metal hitting sound.

As a technique for eliminating such a hitting sound occurring in adjustment of a tilt position, there has been disclosed a technique that provides smooth sliding of a fixed cam member in adjustment of a tilt position and reduces a hitting sound occurring when a protruded portion of a fixed cam member is abutted against a groove end portion of a long groove for tilt-position adjustment at a tilt-position adjustment end by integrally forming the fixed cam member and a locking unit made of a synthetic resin (see Patent Literature 1).

However, although the steering device of Patent Literature 1 serves to reduce a sliding sound and a hitting sound occurring between the fixed cam member and the long groove for tilt-position adjustment, it does not reduce a hitting sound between a movable cam member and the fixed cam member forming a clamp mechanism.

On the other hand, in order to decelerate the releasing speed of a tilt lever, in Patent Literature 2, an elastic member is provided on bottom surfaces of cam protrusions of a clamp mechanism. The elastic member is provided to contact with cam protrusions of a mating cam and brake the cam when releasing the tilt lever.

CITATION LIST

Patent Literature

PTL 1: JP 2008-307959 A
PTL 2: JP 2006-51876 A

SUMMARY OF INVENTION

Technical Problems

However, in Patent Literature 2 also, it is necessary to make the amount of cam lift large. Increase in the amount of cam lift results in a sharp inclination angle, leading to problems such as a heavier operation force of the tilt lever. Thus, there has been room for improvement.

The present invention has been accomplished in view of the conventional techniques. It is an object of the invention to provide a steering device that reduces a hitting sound occurring upon release of clamping by a clamp mechanism and has high operability.

Solution to Problems

In order to achieve the object mentioned above, according to an aspect of the present invention, there is provided a steering device including a clamp mechanism including: a shaft rod bridged across a vehicle-body attachment bracket supporting a steering column; a fixed cam member and a movable cam member configured to cause mutually opposing cam protrusions to be engaged with each other, and axially move the shaft rod in cooperation with each other; and an operation lever for moving the movable cam member.

A buffer member is provided between a plurality of first stopper portions protruding along a circumferential direction on an outer edge portion of a cam protrusion-formed surface on which the cam protrusions of the fixed cam member are formed and a plurality of second stopper portions protruding along a circumferential direction on an outer edge portion of a cam protrusion-formed surface on which the cam protrusions of the movable cam member are formed such that the second stopper portions are loosely fitted into first notch portions formed between the plurality of first stopper portions.

The buffer member may be interposed between the first stoppers and the second stoppers when operating the operation lever in a releasing direction so as to prevent contact between the first and second stoppers due to inertia generated upon release of the operation lever.

In addition, in the above-mentioned steering apparatus, the buffer member may be connected to an outer ring portion that is fitted into an outer peripheral surface of at least one of the fixed cam member and the movable cam member.

In addition, in the above-mentioned steering apparatus, a plurality of second notch portions may be provided on the outer peripheral surface of the at least one of the fixed cam member and the movable cam member, and a plurality of engagement portions may be provided on an inner peripheral surface of the outer ring portion, each of the plurality of engagement portions being engaged with each of the plurality of second notch portions.

In addition, in the above-mentioned steering apparatus, the buffer member and the engagement portions may be arranged point-symmetrically by 180 degrees with respect to a rotation center of the fixed cam member and the movable cam member.

In addition, in the above-mentioned steering apparatus, the engagement portions in a state of engagement with the second notch portions may be coincident with the cam protrusion-formed surface.

In addition, in the above-mentioned steering apparatus, the engagement portions in a state of engagement with the second notch portions may be higher than the cam protrusion-formed surface and smaller than a sum of gaps when the clamp mechanism is released.

Furthermore, in the above-mentioned steering apparatus, the buffer member may be made of synthetic resin and is integrally molded.

Advantageous Effects of Invention

According to an aspect of the present invention, there can be provided a steering device that reduces a hitting sound occurring upon release of clamping by a clamp mechanism and has high operability without changing the amount of lift of cam mountains (cam protrusions).

DESCRIPTION OF EMBODIMENTS

In the following detailed description, numerous specific details are set forth in order to provide a through understanding of embodiments of the present invention. It will be, however, apparent that one or more embodiments can be practiced even without such specific details. Additionally, known structures and devices are depicted in schematic drawings in order to simplify the representations thereof.

Hereinafter, embodiments of a steering device according to the present invention will be described with reference to the drawings.

Figure 1:
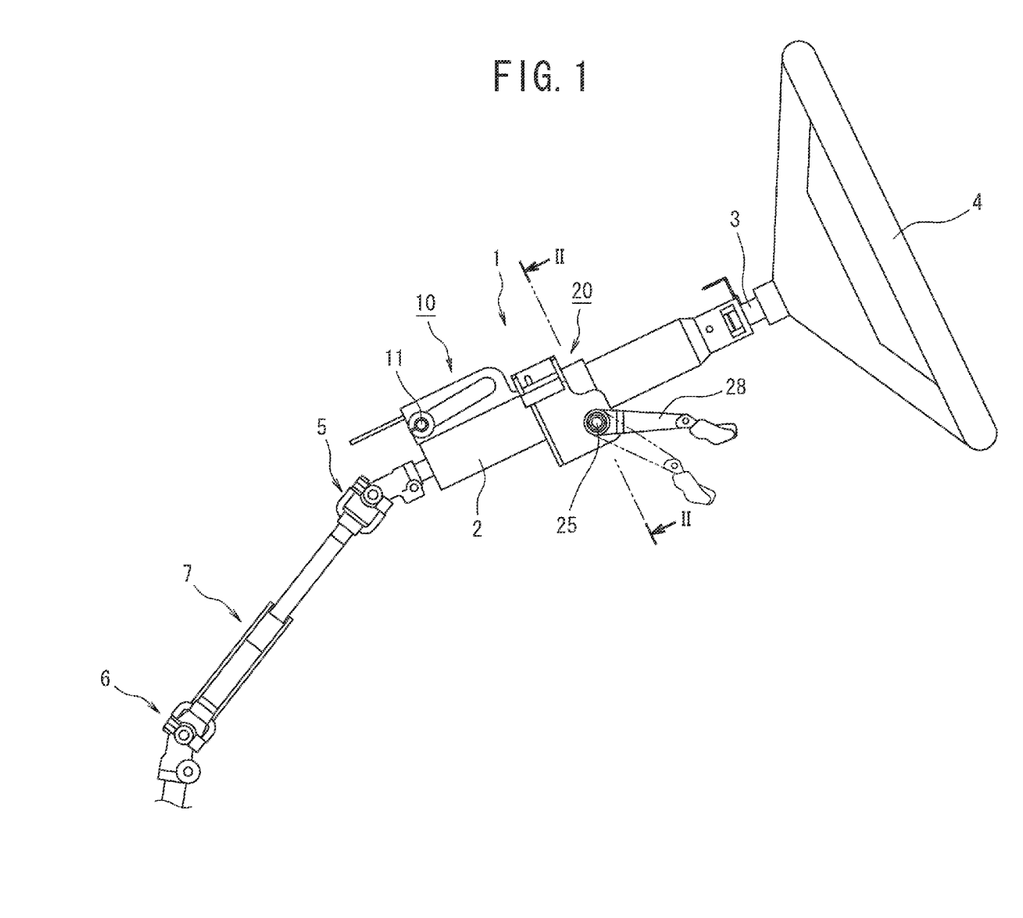
FIG. 1 is a side view depicting the structure of an embodiment of a steering device.
Figure 2:
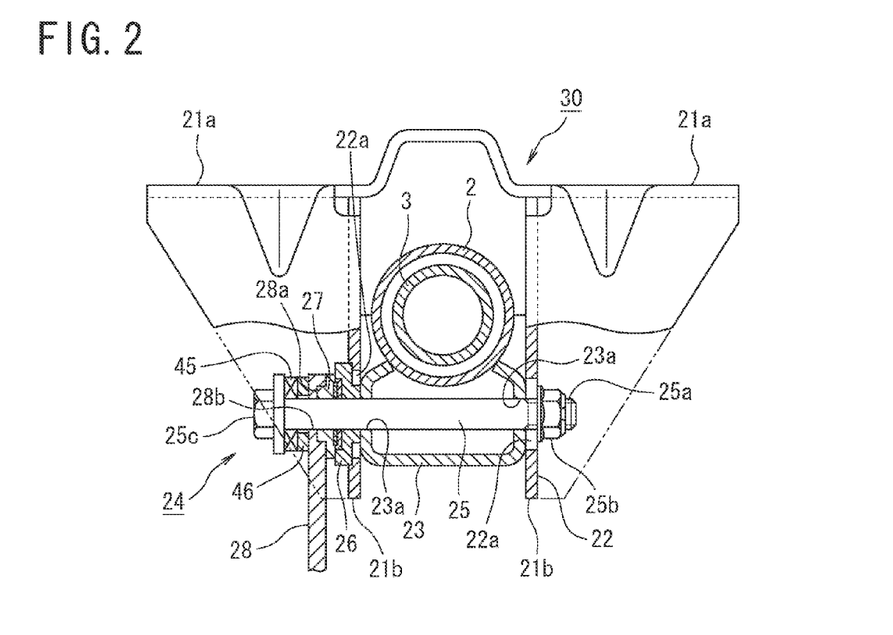
FIG. 2 is a sectional view taken along line II-II of FIG. 1.
Figure 3:
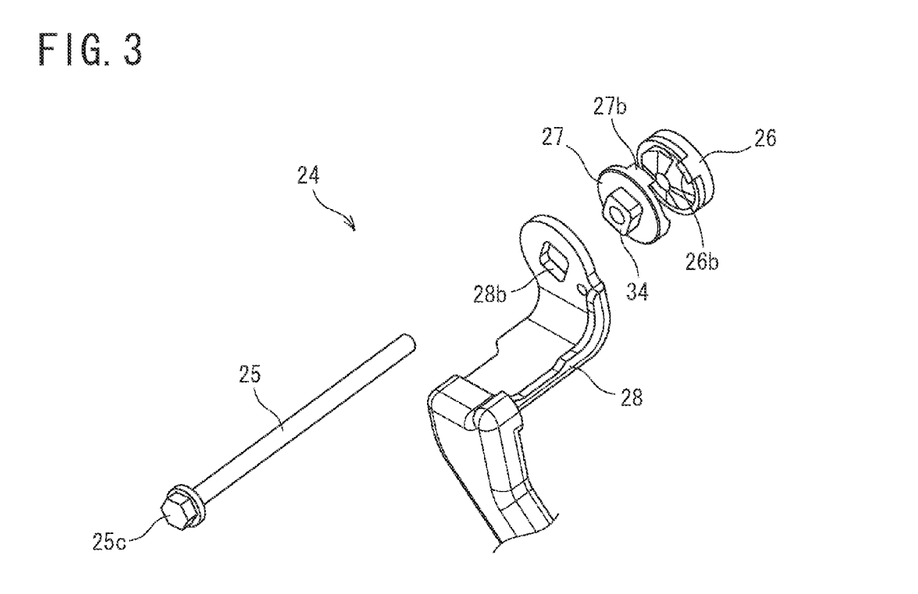
FIG. 3 is an exploded perspective view depicting the structure of a clamp mechanism in an embodiment of the steering device.

FIG. 1 is a side view of a structure in an embodiment of the steering device. In addition, FIG. 2 is a sectional view taken along line II-II of FIG. 1. Additionally, FIG. 3 is an exploded perspective view of the structure of a clamp mechanism in an embodiment of the steering device.

(Structure of Steering Device)

As depicted in FIG. 1, a steering device 1 includes a cylindrical steering column 2, a steering shaft 3 passing through the inside of the steering column 2, a steering wheel 4 that is attached to an upper end of the steering shaft 3 and to which a steering force is applied from a driver, and an intermediate shaft 7 having a spline connection structure in which the intermediate shaft 7 is connected to a lower end of the steering shaft 3 via a universal joint 5 and the other end thereof is connected to an unillustrated steering gear via a universal joint 6.

The steering column 2 is supported to an unillustrated vehicle body-side member by a lower bracket 10 formed at an end portion of the universal joint 5 side and a tilt mechanism 20 fixed to an axial center portion.

The lower bracket 10 includes a tilt pin 11 serving as a center of tilt operation, and the steering column 2 is configured to rotate around the tilt pin 11 as the center.

In addition, as depicted in FIG. 2, the tilt mechanism 20 includes a tilt bracket 22 where a vehicle body-side attachment portion 21a formed at an upper part to be attached to the unillustrated vehicle body-side member and a pair of clamping plate members 21b in a lateral direction (a vehicle widthwise direction) through which the steering column 9 is inserted at a center of the clamping plate members 21b and extending in a substantially vertical direction as seen in FIG. 2 are formed integrally, a distance bracket 23 attached to the steering column 2 and slidably retained between the clamping plate portions 21b, and a clamp mechanism 24 that locks and unlocks by sandwiching the distance bracket 23 by the clamping plate portions 21b of the tilt bracket 22 in the tilt bracket 22.

In the distance bracket 23 is formed a through-hole 23a passing therethrough in a lateral direction thereof, and in the clamping plate portions 21b of the tilt bracket 22 is formed a substantially rectangular tilt hole 22a whose longitudinal direction vertically extends at positions corresponding to the through-holes 23a.

The clamp mechanism 24 includes a tilt bolt 25, a fixed cam member 26, a rotatable movable cam member 27, and a tilt lever 28 that integrally rotates with the movable cam member 27, as depicted in FIG. 3.

The tilt bolt 25 is a shaft body that passes through the tilt holes 22a of the tilt bracket 22 and holes of the distance bracket 23. The tilt bolt 25 has a male screw portion 25a at one end thereof and a head portion 25c at the other end thereof. The male screw portion 25a protruding from the clamping plate portion 21b of the tilt bracket 22 is screwed with a nut 25b. In addition, the fixed cam member 26 and the rotatable movable cam member 27 apply an axial force to the tilt bolt 25 disposed between the head portion 25c and the tilt bracket 22 around the tilt bolt 25.

<Cam Members>

Next, a description will be given of the cam members (the fixed cam member and the movable cam member) that are used in the steering device of the present embodiment with reference to the drawings.

Figure 4A:
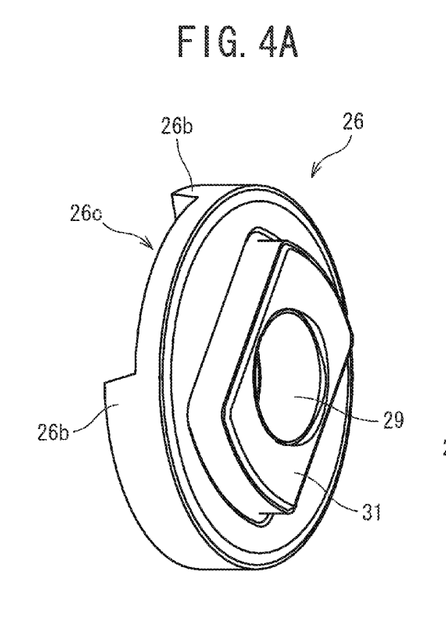
FIGS. 4A and 4B are perspective views depicting a fixed cam member of an embodiment of the steering device.
Figure 4B:
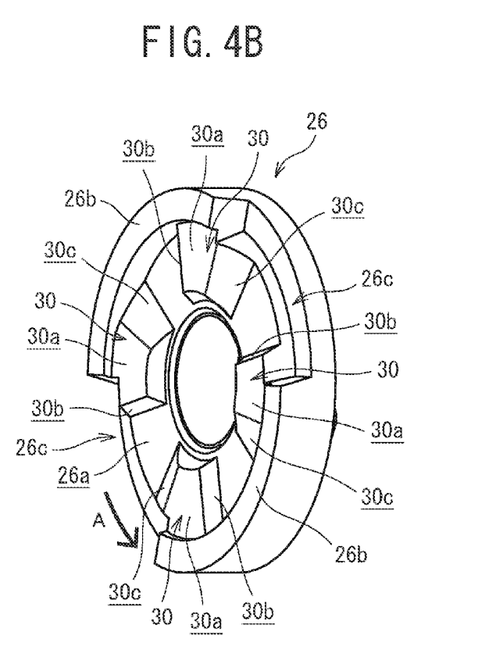
Figure 5A:
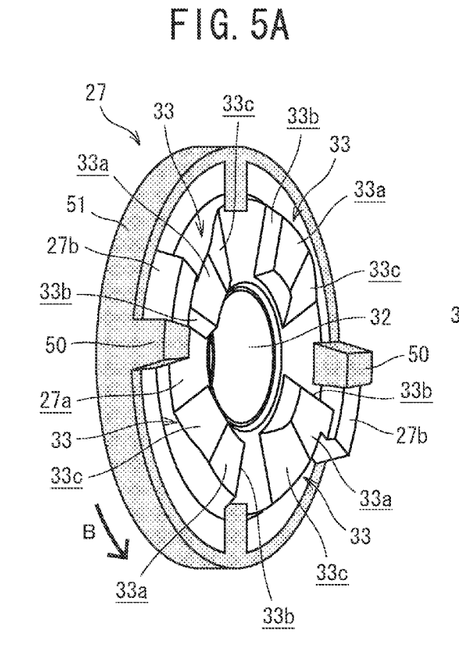
FIGS. 5A and 5B are perspective views depicting a movable cam member of an embodiment of the steering device.
Figure 5B:
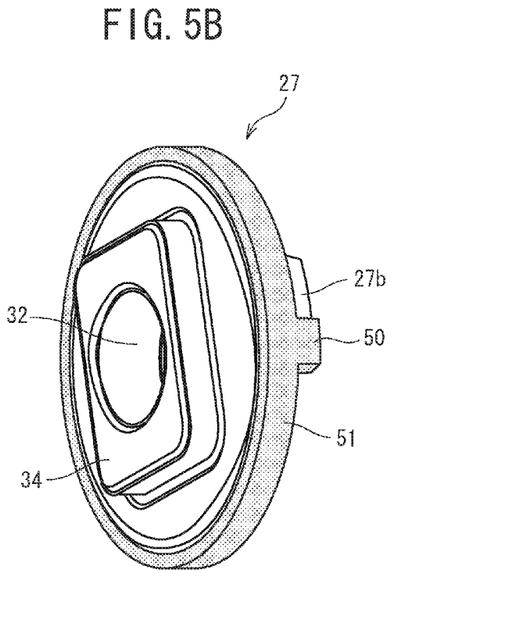
Figure 6A:
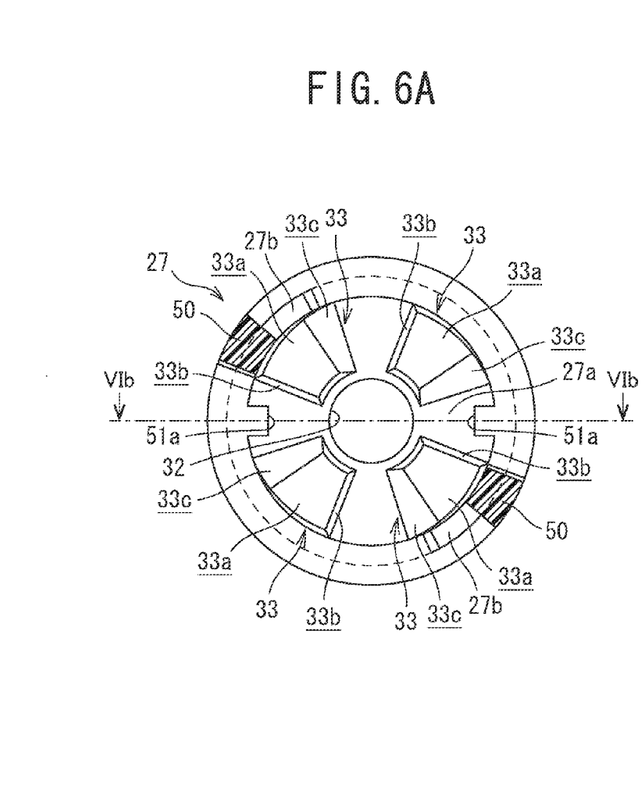
FIGS. 6A to 6C are diagrams depicting the structure of a movable cam member of an embodiment of the steering device.
Figure 6B:
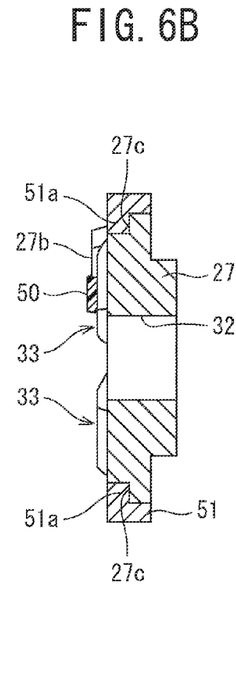
Figure 6C:
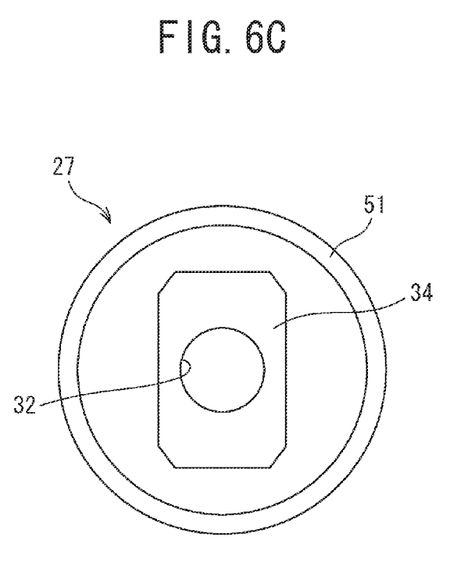

FIGS. 4A and 4B are perspective views depicting a fixed cam member of an embodiment of the steering device, in which FIG. 4A is a perspective view of a side of the fixed cam member having a boss formed thereon, and FIG. 4B is a perspective view of a side thereof having a cam surface formed thereon. Additionally, FIGS. 5A and 5B are perspective views depicting a movable cam member of an embodiment of the steering device, in which FIG. 5A is a perspective view of a side of the movable cam member having a cam surface formed thereon, and FIG. 5B is a perspective view of a side thereof having a boss formed thereon. In addition, FIGS. 6A to 6C are diagrams depicting the structure of a movable cam member of an embodiment of the steering device, in which FIG. 6A is a plan view of a side of the movable cam member having a cam surface formed thereon, FIG. 6B is a sectional view taken along line VIb-VIb of FIG. 6A, and FIG. 6C is a plan view of a side thereof having a boss formed thereon.

[Fixed Cam Member]

As depicted in FIGS. 4A and 4B, the fixed cam member 26 includes a bolt through-hole 29 that is formed at a center position of a substantially disk-shaped member and through which the tilt bolt 25 is inserted and passes, a plurality of cam protrusions 30 formed to be aligned on the same circumference on a cam protrusion-formed surface 26a facing the movable cam member 27, and a boss 31 that is formed on a surface of the fixed cam member opposite to the surface having the cam protrusions 30 formed thereon and that is inserted into the tilt hole 22a formed in the clamping plate member 21b of the tilt bracket 22.

The plurality of cam protrusions 30 of the fixed cam member 26 all have the same shape and are substantially circular-sector shaped as seen from an axial direction of the bolt through-hole 29, as depicted in FIG. 4A.

The cam protrusions 30 include a flat cam surface 30a, a first inclined cam surface 30b, and a second inclined cam surface 30c.

The flat cam surface 30a is a surface that protrudes with the same height from the cam protrusion formed surface 26a and has a smooth surface shape. In addition, the first inclined cam surface 30b is a surface formed continuously from the flat cam surface 30a by being inclined downward (in a direction in which the protruding height of the cam protrusions 30 gradually decreases) as proceeding in a first circumferential direction (indicated by A in the drawing) on the basis of the axial direction of the bolt through-hole 29. Additionally, the second inclined cam surface 30c is a surface formed continuously from the flat cam surface 30a by being inclined downward as proceeding in the other circumferential direction (a direction opposite to the first circumferential direction). Herein, the angle (from 80° to 90°) between the first inclined cam surface 30b and the cam protrusion-formed surface 26a is larger than the angle between the second inclined cam surface 30c and the cam protrusion-formed surface 26a, and the first inclined cam surface 30b may be referred to as "back surface (30b)" in the present embodiment.

In addition, in the fixed cam member 26, there are formed two stopper portions (first stopper portions) 26b protruding along an outer peripheral edge portion of the cam protrusion-formed surface 26a, as depicted in FIG. 3 and FIGS. 4A and 4B. Thereby, a notch portion (a first notch portion) 26c is formed between the two stopper portions 26b.

In other words, when the fixed cam member 26 and the movable cam member 27 are stacked together, stopper portions 27b of the movable cam member 27 that will be described later are disposed in the notch portions 26c, and a movable range of the stopper portions 27b is limited to within a circumferential range of the notch portions 26c.

[Movable Cam Member]

The movable cam member 27 has a substantially disk shape and includes a bolt through-hole 32, a plurality of cam protrusions 33, and a boss 34, as depicted in FIGS. 5A and 5B and FIGS. 6B and 6C. The bolt through-hole 32 is a thorough-hole that is formed by piercing through at a center position of the movable cam member 27 and through which the tilt bolt 25 is inserted and passes. The plurality of cam protrusions 33 are formed to be aligned on the same circumference on the cam protrusion-formed surface 27a facing the fixed cam member 26. In addition, the boss 34 is a member that is formed on a surface of the movable cam member on a side opposite to the cam protrusion-formed surface 27a having the plurality of cam protrusions 33 formed thereon and that is inserted into a square hole 28a formed in the tilt lever 28.

The plurality of cam protrusions 33 of the movable cam member 27 also all have the same shape that is a substantially circular-sector shape as seen from an axial direction of the bolt through-hole 32, as depicted in FIG. 5A, and include a flat cam surface 33a, a first inclined cam surface 33b, and a second inclined cam surface 33c.

The flat cam surface 33a is a surface having a smooth surface shape that protrudes with the same height from the cam protrusion-formed surface 27a. In addition, the first inclined cam surface 33b is a surface formed continuously from the flat cam surface 33a by being inclined downward (in a direction in which the protruding height of the cam protrusions 33 gradually decreases) as proceeding in a second circumferential direction (indicated by B in the drawing) on the basis of the axial direction of the bolt through-hole 32. Additionally, the second inclined cam surface 33c is a surface formed continuously from the flat cam surface 33a by being inclined downward as proceeding in the other circumferential direction (a direction opposite to the second circumferential direction).

In addition, the first direction in the fixed cam member 26 and the second direction in the movable cam member 27 are directions opposite to each other in a mode in which the fixed cam member 26 and the movable cam member 27 are stacked together in such a manner that the cam protrusion-formed surfaces of the respective members are opposed to each other (see FIG. 3).

In addition, the angle (from 80° to 90°) between the first inclined cam surface 33b and the cam protrusion-formed surface 27a is larger than the angle between the second inclined cam surface 33c and the cam protrusion-formed surface 27a, and the first inclined cam surface 33b may be referred to as "back surface (33b)" in the present embodiment.

[Stopper Portion]

In addition, in the movable cam member 27, there are formed two stopper portions (second stopper portions) 27b protruding along an outer peripheral edge portion of the cam protrusion-formed surface 27a, as depicted in FIG. 3 and FIGS. 5A and 5B. The stopper portions 27b are formed so as to be shorter in the circumferential direction than the stopper portions (first stopper portions) 26b of the fixed cam member 26.

Furthermore, the fixed cam member 26 and the movable cam member 27 are stacked together so that each of the stopper portions 27b is disposed in the notch portion 26c formed between the two stopper portions 26b. In other words, the movable range of the stopper portion 27b is limited to within the circumferential range of the notch portion 26c.

Herein, the movable range of the stopper portion 27b limited to within the circumferential range of the notch portion 26c is a rotation range of the movable cam member 27 with respect to the fixed cam member 26 when the tilt lever 28 is rotated between a position indicated by a two-dotted chain line (an unlock position) and a position indicated by a solid line (a lock position) in FIG. 1. In a case in which the tilt lever 28 is rotated from the lock position to the unlock position, the cam protrusions 33 abutted with the cam protrusions 30 are moved to the cam protrusion-formed surface 26a, whereby the back surfaces 30b of the cam protrusions 30 come close to and may collide with the back surfaces 33b of the cam protrusions 33. For that reason, a circumferential formation range for the stopper portions 26b forming the notch portions 26c is designed so as to prevent collision between the back surfaces 30b of the cam protrusions 30 and the back surfaces 33b of the cam protrusions 33.

[Buffer Member]

Herein, in the movable cam member 27, there is provided a buffer member 50 arranged on the basis of the stopper portions 27b in a direction for clamping by the clamp mechanism in combination with the fixed cam member 26 (a direction indicated by "B" in FIG. 5A) and abutted against the stopper portion 27b. The buffer member 50 is connected to an outer ring portion 51 having a cylindrical shape fitted into an outer peripheral surface of the movable cam member 27. Additionally, on an inner peripheral surface of the outer ring portion 51 is provided a fitting portion 51b fitted into a notch portion 27d formed in the outer peripheral surface of the movable cam member 27, and being axially connected to the buffer member 50. In FIGS. 5A and 5B, the buffer member 50 and the outer ring portion 51 are indicated by hatching for easier understanding of the description.

Additionally, as depicted in FIGS. 6A and 6B, notch portions (second notch portions) 27c are formed at mutually opposing positions on a peripheral edge portion of the cam protrusion-formed surface 27a of the movable cam member 27. Additionally, on the inner peripheral surface of the outer ring portion 51 are provided engagement portions 51a formed so as to be capable of being engaged with the notch portions 27c by protruding radially inward in a manner corresponding to arrangement positions of the notch portions 27c. In other words, the inner peripheral surface of the outer ring portion 51 connected to the buffer member 50 is fitted into the outer peripheral surface of the movable cam member 27 and the engagement portions 51a are engaged with the notch portions 27c, whereby circumferential misalignment of the buffer member 50 with respect to the movable cam member 27 can be prevented.

Additionally, it is also possible to prevent the flat cam surfaces 33a from colliding with the cam protrusion-formed surface 26a by making the engagement portions 51a in a state of engagement with the second notch portions 27c smaller than the sum of gaps of the clamp mechanism 24 when the clamp mechanism 24 is unlocked and higher than the cam protrusion-formed surface 27a, i.e., by making it slightly higher than the cam protrusion-formed surface 27a.

In this case, when the buffer member 50 can sufficiently reduce a collision sound, the height of the engagement portions 51a may be made coincident with the height of the cam protrusion-formed surface 27a. In any case, it is unnecessary to make the height of the cam mountains (cam protrusions) high.

The buffer member 50 arranged on the basis of the stopper portions 27b in the direction for clamping by the clamp mechanism will be interposed between the stopper portions 26b and the stopper portions 27b when the fixed cam member 26 and the movable cam member 27 are combined and unlocked, as will be described later. Accordingly, when releasing clamping by the clamp mechanism, a collision sound can be reduced that can occur due to inertia of the tilt lever 28 by a reaction force of the tilt bracket 22.

Since the buffer member 50 is arranged so as to be compressed by being sandwiched by the stopper portion 26b and the stopper portion 27b, it is required to have neither fracture nor damage as occurring when used in stretching and thus have high durability. Accordingly, the material of the buffer member 50 is not particularly limited as long as it has elasticity and is high in heat resistance, fatigue resistance, ozone resistance, and flame resistance, as well as in oil resistance, chemical drug resistance, mechanical strength, and the like, and can be selected as needed according to purposes. Examples of the material of the buffer member 50 include synthetic resins such as polyacetal (POM) and polyamide (PA) and synthetic rubbers such as elastomers. A hitting sound can be further prevented by employing, as the synthetic rubbers such as elastomers, rubber materials such as chloroprene rubber (CR), nitrile rubber (NBR), some sort of urethane rubber of thermosetting resin-based elastomers, silicone rubber, and fluorine rubber. In addition, a filler such as glass may be added to the material of the buffer member 50. The buffer member 50 is preferably produced by integral molding or insert molding.

The level of the elasticity of the buffer member 50 can be any level as long as it serves to reduce a hitting sound occurring due to metal contact between the stopper portions 26b and 27b when the buffer member 50 is sandwiched between the stopper portion 26b of the fixed cam member 26 and the stopper portion 27b of the movable cam member 27, as will be described later.

Additionally, the cam protrusion-formed surfaces 26a and 27a of the fixed cam member 26 and the movable cam member 27 are coated with grease for preventing abrasion.

Then, the tilt lever 28 is engaged with the position indicated by the two-dotted chain line of FIG. 1 in a state where the flat cam surfaces 30a of the fixed cam member 26 are opposed to the cam protrusion-formed surface 27a of the movable cam member 27 and, similarly, the second inclined cam surfaces 30c of the fixed cam member 26 are opposed to the second inclined cam surfaces 33c of the movable cam member 27, respectively. At this time, the stopper portions 26b of the fixed cam member 26 and the stopper portions 27b of the movable cam member 27 are positioned so as to be opposed to each other in the circumferential direction via the buffer member 50 (see FIG. 7A).

Then, the tilt bolt 25 is inserted through the insertion hole 28b formed in the tilt lever 28, the bolt through-hole 29 of the fixed cam member 26, the tilt holes 22a formed in the clamping plate portions 21b of the tilt bracket 22, and the through-holes 23a of the distance bracket 23.

Furthermore, the nut 25b is screwed with the male screw portion of the tilt bolt 25 protruded from the tilt bracket 22 in a state where a thrust bearing 45 inserted through to the head portion 25c side is abutted against an end face of the tilt lever 28 opposite to the movable cam member 27 via a metal washer 46, whereby the clamp mechanism 24 is formed.

[Operation of Clamp Mechanism]

Next, operation of the clamp mechanism in the present embodiment will be described.

Figure 7A:
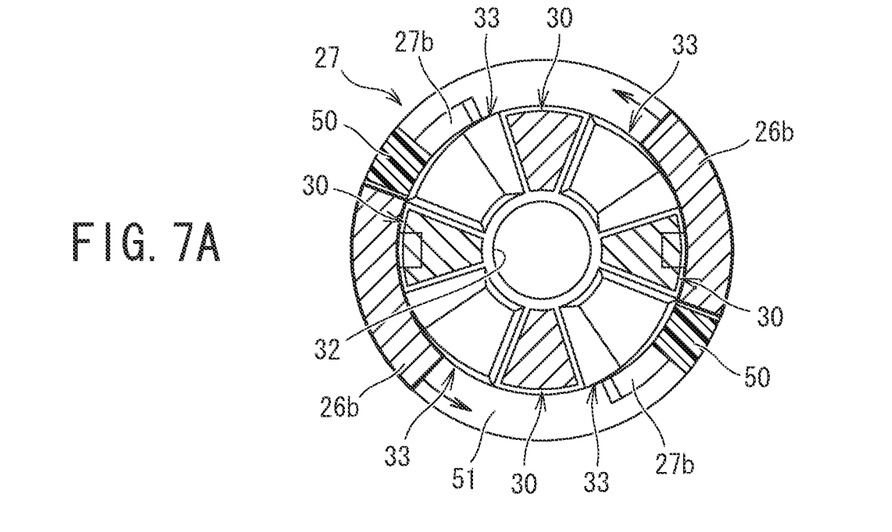
FIGS. 7A and 7B are plan views illustrating operation of a clamp mechanism in an embodiment of the steering device.
Figure 7B:
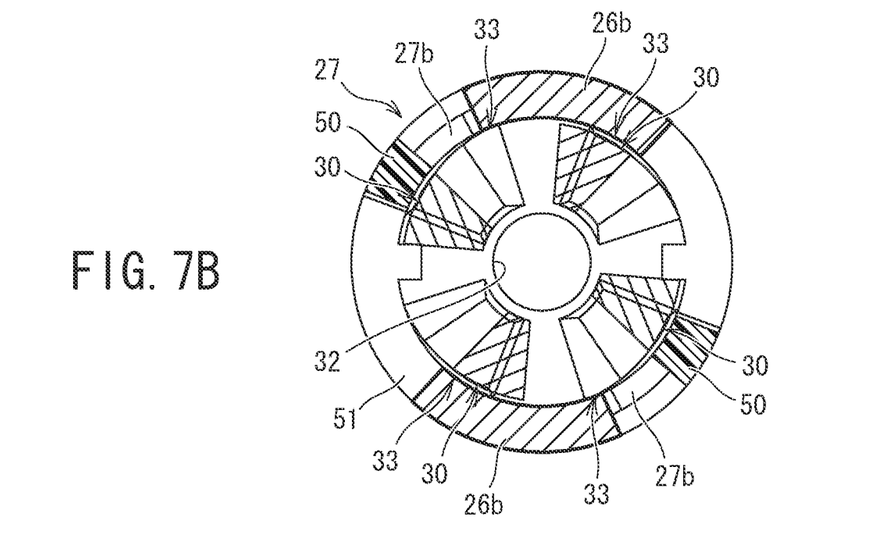

FIGS. 7A and 7B are plan views illustrating operation of a clamp mechanism in an embodiment of the steering device, in which FIG. 7A depicts the position of each cam protrusion of each cam member when a tilt lever is located in an unlock position, and FIG. 7B depicts the position of each cam protrusion of each cam member when the tilt lever is located in a lock position.

In addition, FIGS. 7A and 7B are plan views as seen toward the cam protrusion-formed surface 27a side of the movable cam member 27, of the two cam members stacked together. For easier understanding of the description, in the fixed cam member 26, only the cam protrusions 30 and the stopper portions 26b (all indicated by hatching) are depicted. Additionally, the buffer member 50 is also indicated by hatching for easier understanding of the description.

When the tilt lever 28 is located in the two-dotted chain line position of FIG. 1, the cam protrusions 30 of the fixed cam member 26 and the cam protrusions 33 of the movable cam member 27 come in slight contact and the tilt lever 28 is located in the unlock position where the axial force of the tilt bolt 25 is reduced (see FIG. 7A).

In the unlock position, there is no occurrence of any axial force to the tilt bolt 25 by the fixed cam member 26 and the movable cam member 27. Thus, a slight gap may be formed or slight contact may be made between the clamping plate members 21b of the tilt bracket 22 and the distance bracket 23. In this state, by holding and vertically moving the steering wheel 4, the steering column 2 is vertically moved centering on a tilt pin 13 and thereby can be moved to a position preferable for a driver.

Then, the tilt lever 28 is rotated to the lock position indicated by the solid line of FIG. 1 from the two-dotted chain line of FIG. 1 (the unlock position).

When the tilt lever 28 is rotated to the lock position, the flat cam surfaces 33a of the movable cam member 27 interlocking with the tilt lever 28 slide and are abutted against the flat cam surfaces 30a of the fixed cam member 26, as depicted in FIG. 7B. In this manner, when the flat cam surfaces 30a and 33a of the fixed cam member 26 and the movable cam member 27 are abutted against each other, an axial force to the tilt bolt 25 occurs.

At this time, as depicted in FIG. 2, since one end of the tilt bolt 25 is fixed to a right end side of the tilt bracket 22 by the nut 25b and the other end thereof has the head portion 25c formed thereat, a reaction force presses the fixed cam member 26 rightward and the clamping plate portion 21b of the right side of the tilt bracket 22 leftward. Due to this, the gap between the clamping plate portions 21b of the tilt bracket 22 is narrowed, thereby resulting in a locked state in which the distance bracket 23 is firmly retained therebetween.

As described above, in the present embodiment, the buffer member 50 has been provided in such a manner as to be adjacent to at least either the stopper portions 26b of the fixed cam member 26 or the stopper portions 27b of the movable cam member 27. In this case, the position for providing the buffer member 50 is a position between the stopper portions 27b of the movable cam member 27 loosely fitted into the notch portions 26c of the fixed cam member 26 and the stopper portions 26b positioned in a direction for clamping the clamp mechanism on the basis of the loosely fitted stopper portions 27b.

Accordingly, when the tilt lever 28 is rotated to bring the fixed cam member 26 and the movable cam member 27 from the locked state (see FIG. 7B) to the unlocked state (see FIG. 7A), the buffer member 50 is interposed between the stopper portions 26b and 27b. As a result of that, there can be provided a steering device that reduces a hitting sound occurring upon release of clamping by the clamp mechanism and has high operability without changing the height of the cam mountains (cam protrusions).

Other Embodiments

Next, other embodiments of the steering device will be described below with reference to the drawings.

Figure 8:
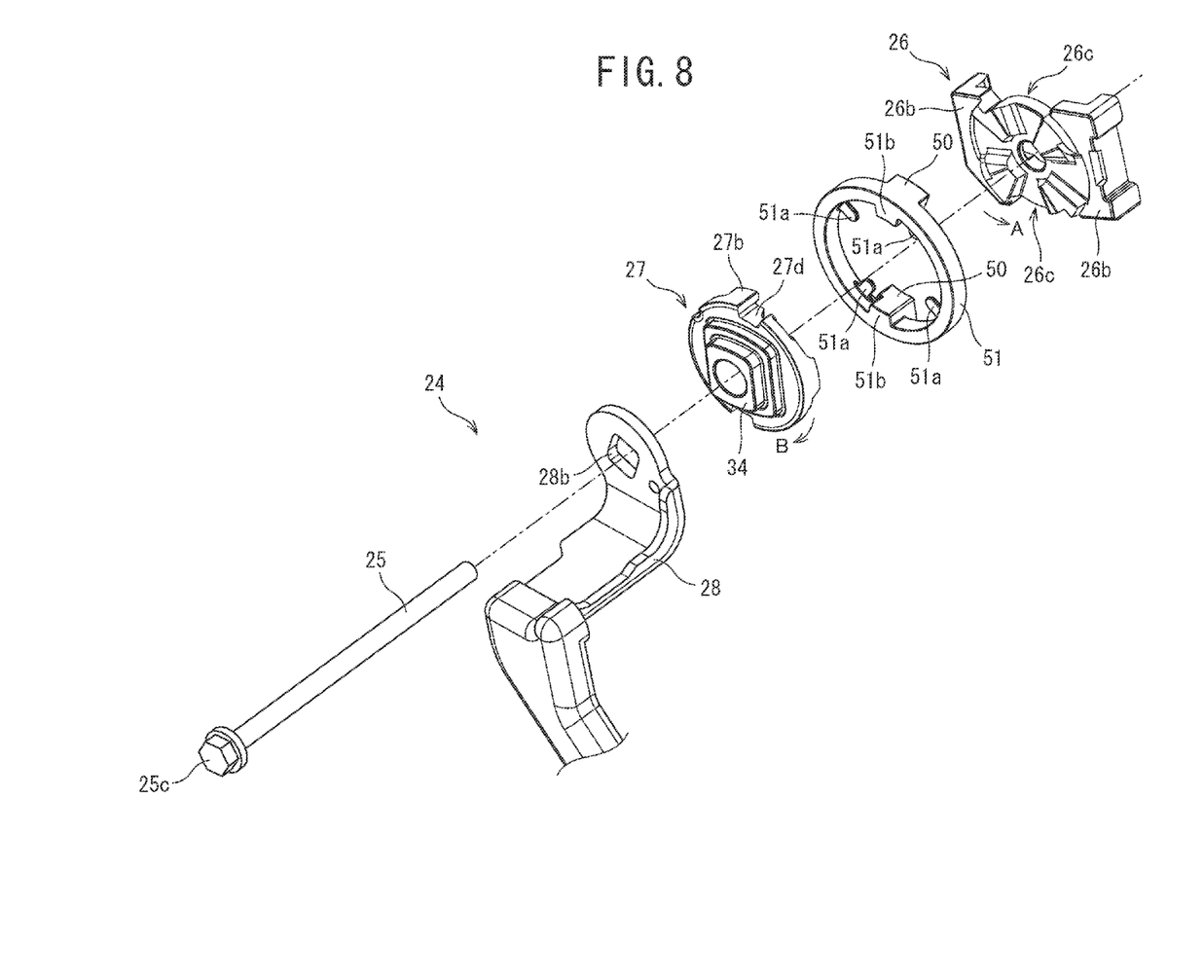
FIG. 8 is an exploded perspective view depicting the structure of a clamp mechanism in another embodiment of the steering device.
Figures 9A, 9B, 9C, 9D, 9E:
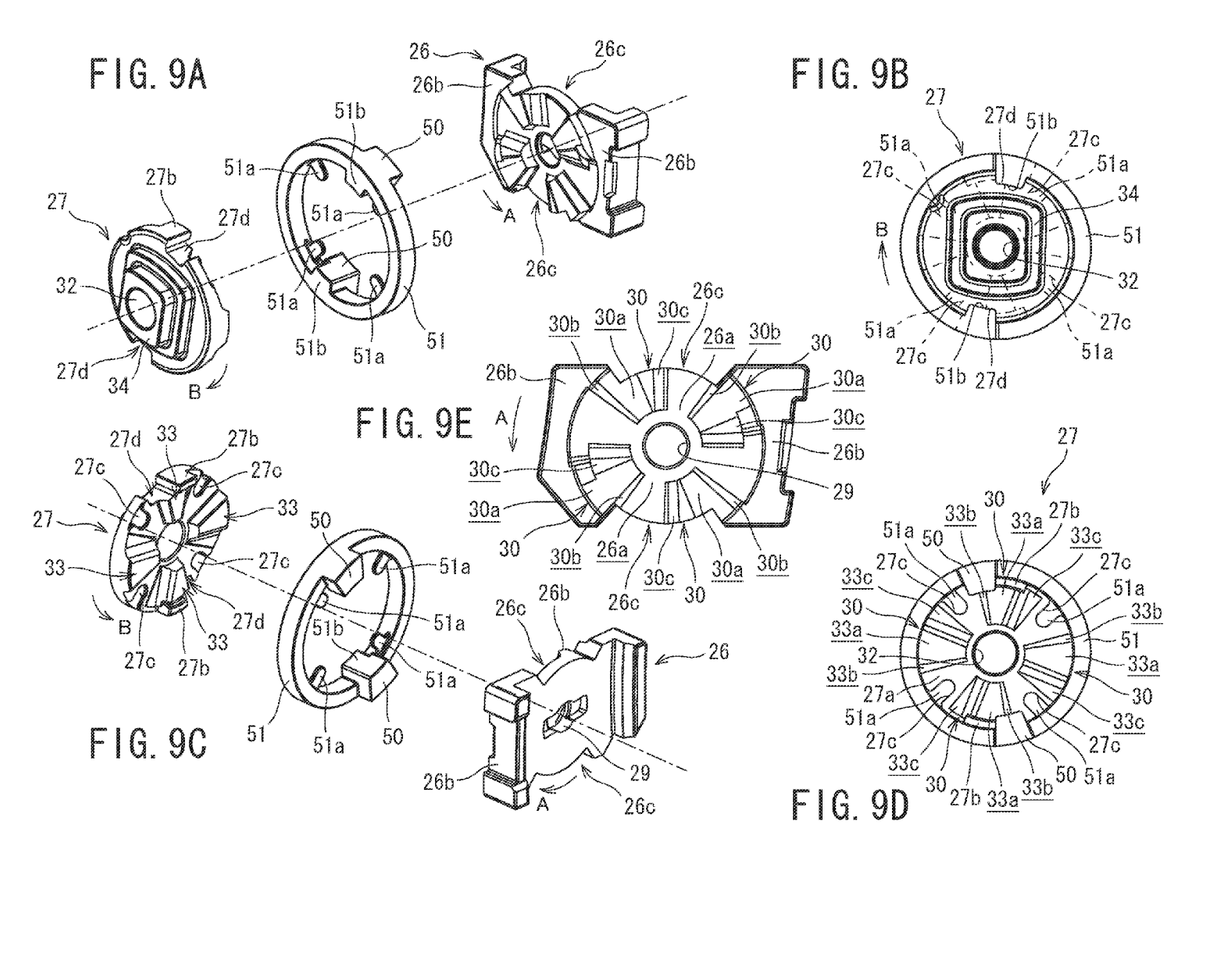
FIGS. 9A to 9E are diagrams depicting the structures of a movable cam member and a fixed cam member of another embodiment of the steering device.

FIG. 8 is an exploded perspective view depicting the structure of a clamp mechanism in another embodiment of the steering device. Additionally, FIGS. 9A to 9E are diagrams depicting the structures of a movable cam member and a fixed cam member of another embodiment of the steering device, in which FIG. 9A is an exploded perspective view of the movable cam member and the fixed cam member as seen from a movable cam member side, FIG. 9B is a plan view of the movable cam member with a buffer member attached thereto as seen from a side where a boss is formed, FIG. 9C is an exploded perspective view of the movable cam member and the fixed cam member as seen from a fixed cam member side, FIG. 9D is a plan view of the movable cam member with a buffer member attached thereto as seen from a cam surface side, and FIG. 9E is a plan view of the fixed cam member as seen from a cam surface side.

As depicted in FIG. 8, a clamp mechanism 24 includes a tilt bolt 25, a fixed cam member 26 and a rotatable movable cam member 27, and a tilt lever 28 that integrally rotates with the movable cam member 27. In addition, a buffer member 50 is attached to the movable cam member 27.

The tilt bolt 25 is a shaft body that passes through tilt holes 22a of a tilt bracket 22 and holes of a distance bracket 23. A male screw portion 25a is provided at one end of the tilt bolt 25, and a head portion 25c is provided at the other end thereof. The male screw portion 25a protruding from a clamping plate portion 21b of the tilt bracket 22 is screwed with a nut 25b. In addition, the fixed cam member 26 and the rotatable movable cam member 27 apply an axial force to the tilt bolt 25 disposed between the head portion 25c and the tilt bracket 22 around the tilt bolt 25.

<Cam Members>

Next, a description will be given of the cam members (the fixed cam member and the movable cam member) that are used in the steering device of the present embodiment with reference to FIGS. 9A to 9E.

[Fixed Cam Member]

The fixed cam member 26 includes a bolt through-hole 29 formed at a center position of a disk-shaped portion defined between substantially flat plate shaped members (stopper portions 26b that will be described later), through which the tilt bolt 25 is inserted and passes, and a plurality of cam protrusions 30 formed to be aligned on the same circumference on a cam protrusion-formed surface 26a facing the movable cam member 27, as depicted in FIGS. 9A, 9C, and 9E. Herein, on a surface of the fixed cam member opposite to the surface having the cam protrusions 30 formed thereon is formed a structure fitted into the tilt hole 22a formed in the clamping plate portion 21b of the tilt bracket 22. In addition, the fixed cam member 26 used in the steering device of the present embodiment is depicted in FIG. 9C as an example of a structure hold by a friction multi-plate for fixing a bracket, and therefore it does not have any boss.

As depicted in FIG. 9E, the plurality of cam protrusions 30 of the fixed cam member 26 all have the same shape, and, as in the above-described embodiment (see FIGS. 4A and 4B), are substantially circular-sector shaped as seen from an axial direction of the bolt through-hole 29.

The cam protrusions 30 include a flat cam surface 30a, a first inclined cam surface 30b, and a second inclined cam surface 30c.

The flat cam surface 30a is a surface that protrudes with the same height from the cam protrusion-formed surface 26a and has a smooth surface shape. In addition, the first inclined cam surface 30b is a surface formed continuously from the flat cam surface 30a by being inclined downward (in a direction in which the protruding height of the cam protrusions 30 gradually decreases) as proceeding in a first circumferential direction (indicated by A in the drawing) on the basis of the axial direction of the bolt through-hole 29. Additionally, the second inclined cam surface 30c is a surface formed continuously from the flat cam surface 30a by being inclined downward as proceeding in the other circumferential direction (a direction opposite to the first circumferential direction). Herein, the angle (from 80° to 90°) between the first inclined cam surface 30b and the cam protrusion-formed surface 26a is larger than the angle between the second inclined cam surface 30c and the cam protrusion-formed surface 26a, and the first inclined cam surface 30b may be referred to as "back surface (30b)" in the present embodiment.

In addition, in the fixed cam member 26, there are formed two stopper portions (first stopper portions) 26b protruding along an outer peripheral edge portion of the cam protrusion-formed surface 26a and extended in a flat plate shape, as depicted in FIGS. 9A, 9C, and 9E. Thereby, a notch portion (a first notch portion) 26c is formed between the two stopper portions 26b.

In other words, when the fixed cam member 26 and the movable cam member 27 are stacked together, stopper portions 27b of the movable cam member 27 that will be described later are disposed in the notch portions 26c, and a movable range of the stopper portions 27b is limited to within a circumferential range of the notch portions 26c.

[Movable Cam Member]

The movable cam member 27 has a substantially disk shape and includes a bolt through-hole 32, a plurality of cam protrusions 33, and a boss 34, as depicted in FIGS. 9A to 9D. The bolt through-hole 32 is a thorough-hole that is formed by piercing through at a center position of the movable cam member 27 and through which the tilt bolt 25 is inserted and passes. The plurality of cam protrusions 33 are formed to be aligned on the same circumference on the cam protrusion-formed surface 27a facing the fixed cam member 26. In addition, the boss 34 is a member that is formed on a surface of the cam movable member opposite to the cam protrusion-formed surface 27a having the plurality of cam protrusions 33 formed thereon and that is fitted into a square hole 28a formed in the tilt lever 28.

As depicted in FIGS. 9C and 9D, the plurality of cam protrusions 33 of the movable cam member 27 also all have the same shape, and, as in the above-described embodiment (see FIGS. 5A and 5B), are substantially circular-sector shaped as seen from an axial direction of the bolt through-hole 32, and include a flat cam surface 33a, a first inclined cam surface 33b, and a second inclined cam surface 33c.

The flat cam surface 33a is a surface having a smooth surface shape that protrudes with the same height from the cam protrusion-formed surface 27a. In addition, the first inclined cam surface 33b is a surface formed continuously from the flat cam surface 33a by being inclined downward (in a direction in which the protruding height of the cam protrusions 33 gradually decreases) as proceeding in a second circumferential direction (indicated by B in the drawing) on the basis of the axial direction of the bolt through-hole 32. Additionally, the second inclined cam surface 33c is a surface formed continuously from the flat cam surface 33a by being inclined downward as proceeding in the other circumferential direction (a direction opposite to the second circumferential direction).

In addition, the first direction in the fixed cam member 26 and the second direction in the movable cam member 27 are directions opposite to each other in a mode in which the fixed cam member 26 and the movable cam member 27 are stacked together in such a manner that the cam protrusion-formed surfaces of the respective members are opposed to each other (see FIGS. 10A, 10B, 11A and 11B).

In addition, the angle (from 80° to 90°) between the first inclined cam surface 33b and the cam protrusion-formed surface 27a is larger than the angle between the second inclined cam surface 33c and the cam protrusion-formed surface 27a, and the first inclined cam surface 33b may be referred to as "back surface (33b)" also in the present embodiment.

[Stopper Portion]

In addition, in the movable cam member 27, there are formed two stopper portions (second stopper portions) 27b protruding along an outer peripheral edge portion of the cam protrusion-formed surface 27a, as depicted in FIGS. 9B to 9D. The stopper portions 27b are formed so as to be shorter in the circumferential direction than the stopper portions (first stopper portions) 26b of the fixed cam member 26.

Furthermore, the fixed cam member 26 and the movable cam member 27 are stacked together so that the stopper portion 27b is disposed in the notch portion 26c formed between the two stopper portions 26b. In other words, a movable range of the stopper portion 27b is limited to within the circumferential range of the notch portion 26c.

Herein, the movable range of the stopper portion 27b limited to within the circumferential range of the notch portion 26c is a rotation range of the movable cam member 27 with respect to the fixed cam member 26 when the tilt lever 28 is rotated between a position indicated by a two-dotted chain line (an unlock position) and a position indicated by a solid line (a lock position) in FIG. 1. In a case in which the tilt lever 28 is rotated from the lock position to the unlock position, the cam protrusions 33 abutted with the cam protrusions 30 are moved to the cam protrusion-formed surface 26a, whereby the back surfaces 30b of the cam protrusions 30 come close to and may collide with the back surfaces 33b of the cam protrusions 33. For that reason, a circumferential formation range for the stopper portions 26b forming the notch portions 26c is designed so as to prevent collision between the back surfaces 30b of the cam protrusions 30 and the back surfaces 33b of the cam protrusions 33.

Additionally, as depicted in FIG. 9C, four notch portions (second notch portions) 27c are formed in mutually opposing positions of a peripheral edge portion of the cam protrusion-formed surface 27a of the movable cam member 27. The four notch portions (second notch portions) 27c are preferably arranged point-symmetrically by 180° with respect to a rotation center of the fixed cam member 26 and the movable cam member 27, together with the buffer member that will be described later.

[Buffer Member]

Herein, in the movable cam member 27, there is provided a buffer member 50 arranged on the basis of the stopper portions 27b in a direction for clamping by the clamp mechanism in combination with the fixed cam member 26 (a direction indicated by "B" in FIGS. 9A to 9D) and abutted against the stopper portion 27b. The buffer member 50 is connected to an outer ring portion 51 having a cylindrical shape fitted into an outer peripheral surface of the movable cam member 27. Additionally, on an inner peripheral surface of the outer ring portion 51 is provided a fitting portion 51b fitted into the notch portion 27d formed in the outer peripheral surface of the movable cam member 27, and being axially connected to the buffer member 50.

In addition, it is also possible to prevent the flat cam surface 33a from colliding with the cam protrusion formed surface 26a by making the engagement portion 51a in a state of engagement with the second notch portion 27c smaller than the sum of gaps of the clamp mechanism 24 when the clamp mechanism 24 is unlocked and higher than the cam protrusion formed surface 27a, i.e., making it slightly higher than the cam protrusion-formed surface 27a.

In this case, when the buffer member 50 can sufficiently reduce a collision sound, the height of the engagement portions 51a may be made coincident with the height of the cam protrusion-formed surface 27a. In any case, it is unnecessary to make the height of the cam mountains (cam protrusions) high.

Additionally, on the inner peripheral surface of the outer ring portion 51 are provided four engagement portions 51a formed so as to be capable of being engaged with the notch portions 27c by protruding radially inward in a manner corresponding to arrangement positions of the notch portions 27c. In other words, the inner peripheral surface of the outer ring portion 51 connected to the buffer member 50 is fitted into the outer peripheral surface of the movable cam member 27 and the engagement portions 51a are engaged with the notch portions 27c, whereby circumferential misalignment of the buffer member 50 with respect to the movable cam member 27 can be prevented.

In addition, as described above, by arranging the buffer member 50 and the four notch portions (second notch portions) 27c point-symmetrically by 180° with respect to the rotation center of the fixed cam member 26 and the movable cam member 27, the cam members can be assembled together even if a phase at which the buffer member 50 is fitted into the movable cam member 27 is reversed.

The buffer member 50 arranged on the basis of the stopper portions 27b in the direction for clamping by the clamp mechanism will be interposed between the stopper portions 26b and the stopper portions 27b when the fixed cam member 26 and the movable cam member 27 are combined and unlocked, as will be described later. Accordingly, when releasing clamping by the clamp mechanism, a collision sound can be reduced as a result of that energy that can be generated due to inertia of the tilt lever 28 by the reaction force of the tilt bracket 22 is absorbed by compression of the buffer member 50.

Since the buffer member 50 is arranged so as to be compressed by being sandwiched by the stopper portion 26b and the stopper portion 27b, it is required to have neither fracture nor damage as occurring when used in stretching and thus have high durability. Accordingly, the material of the buffer member 50 is not particularly limited as long as it has elasticity and is high in heat resistance, fatigue resistance, ozone resistance, and flame resistance, as well as in oil resistance, chemical drug resistance, mechanical strength, and the like, and can be selected as needed according to purposes. Examples of the material of the buffer member 50 include synthetic resins such as polyacetal (POM) and polyamide (PA) and synthetic rubbers such as elastomers. A hitting sound can be further prevented by employing, as the synthetic rubbers such as elastomers, rubber materials such as chloroprene rubber (CR), nitrile rubber (NBR), some sort of urethane rubber of thermosetting resin-based elastomers, silicone rubber, and fluorine rubber. In addition, a filler such as glass may be added to the material of the buffer member 50. The buffer member 50 is preferably produced by integral molding or insert molding.

The level of the elasticity of the buffer member 50 can be any level as long as it serves to reduce a hitting sound occurring due to metal contact between the stopper portions 26b and 27b when the buffer member 50 is sandwiched between the stopper portion 26b of the fixed cam member 26 and the stopper portion 27b of the movable cam member 27, as will be described later.

Additionally, the cam protrusion-formed surfaces 26a and 27a of the fixed cam member 26 and the movable cam member 27 are coated with grease for preventing abrasion.

Then, the tilt lever 28 is engaged with the position indicated by the two-dotted chain line of FIG. 1 in a state where the flat cam surfaces 30a of the fixed cam member 26 are opposed to the cam protrusion-formed surface 27a of the movable cam member 27, and similarly, the second inclined cam surfaces 30c of the fixed cam member 26 are opposed to the second inclined cam surfaces 33c of the movable cam member 27, respectively. At this time, the stopper portions 26b of the fixed cam member 26 and the stopper portions 27b of the movable cam member 27 are positioned so as to be opposed to each other in the circumferential direction via the buffer member 50 (see FIGS. 10A and 10B).

Then, the tilt bolt 25 is inserted through the insertion hole 28b formed in the tilt lever 28, the bolt through-hole 29 of the fixed cam member 26, the tilt holes 22a formed in the clamping plate portions 21b of the tilt bracket 22, and the through-holes 23a of the distance bracket 23.

Furthermore, the nut 25b is screwed with the male screw portion of the tilt bolt 25 protruded from the tilt bracket 22 in a state where a thrust bearing 45 inserted through to the head portion 25c side is abutted against an end face of the tilt lever 28 opposite to the movable cam member 27 via a metal washer 46, whereby the clamp mechanism 24 is formed.

[Operation of Clamp Mechanism]

Next, operation of the clamp mechanism in the present embodiment will be described.

Figure 10A:
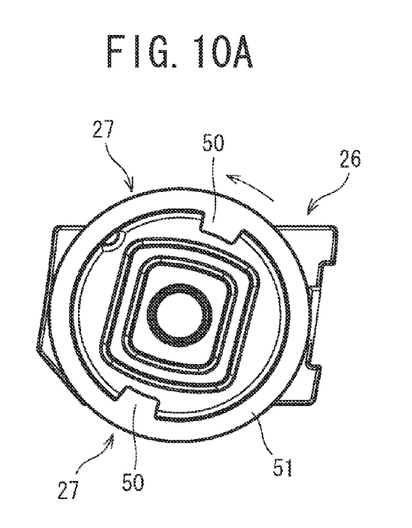
FIGS. 10A and 10B are diagrams illustrating releasing operation of a clamp mechanism in another embodiment of the steering device.
Figure 10B:
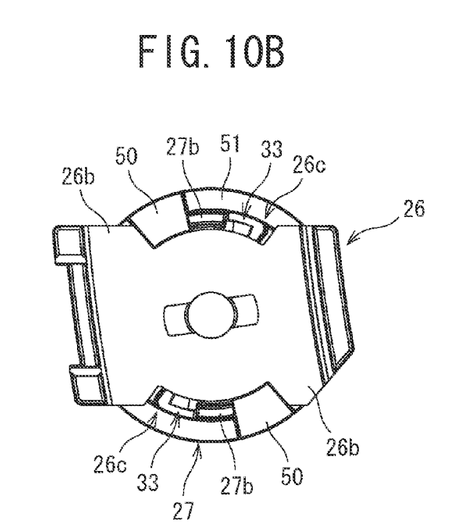
Figure 11A:
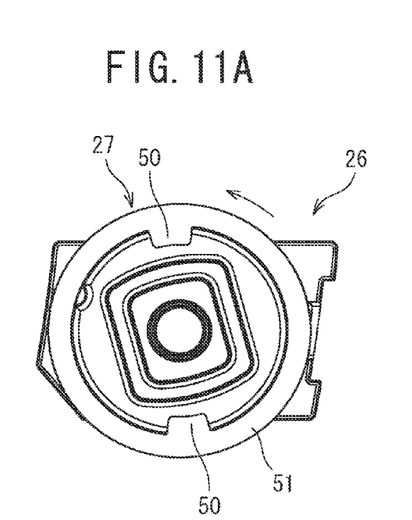
FIGS. 11A and 11B are diagrams illustrating a clamping operation of a clamp mechanism in another embodiment of the steering device.
Figure 11B:
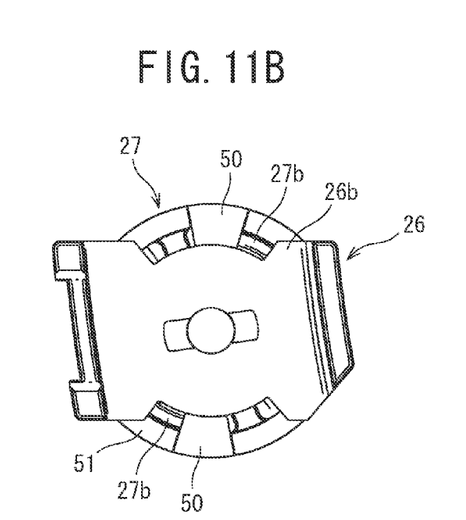

FIGS. 10A and 10B are diagrams illustrating releasing operation of a clamp mechanism (release completion state) in another embodiment of the steering device, in which FIG. 10A depicts a plan view as seen from a movable cam member side, and FIG. 10B is a plan view as seen from a fixed cam member side. In addition, FIGS. 11A and 11B are diagrams illustrating clamping operation of a clamp mechanism (clamping completion state) in another embodiment of the steering device, in which FIG. 11A is a plan view as seen from a movable cam member side, and FIG. 11B is a plan view as seen from a fixed cam member side.

When the tilt lever 28 is located in the two-dotted chain line position of FIG. 1, the cam protrusions (not illustrated) of the fixed cam member 26 and the cam protrusions 33 of the movable cam member 27 come in slight contact and the buffer member 50 is abutted against each of the stopper portions 26b of the fixed cam member 26. In other words, the tilt lever is located in the unlock position where the axial force of the tilt bolt 25 is reduced (see FIGS. 10A and 10B)

In the unlock position, there is no occurrence of any axial force to the tilt bolt 25 by the fixed cam member 26 and the movable cam member 27. Thus, a slight gap may be formed or slight contact may be made between the clamping plate members 21b of the tilt bracket 22 and the distance bracket 23. In this state, by holding and vertically moving the steering wheel 4, the steering column 2 is vertically moved centering on a tilt pin 13 and thereby can be moved to a position preferable for a driver.

Then, the tilt lever 28 is rotated to the lock position indicated by the solid line of FIG. 1 from the two-dotted chain line of FIG. 1 (the unlock position).

When the tilt lever 28 is rotated to the lock position, the stopper portions 27b of the movable cam member 27 interlocking with the tilt lever 28 are abutted against the stopper portions 26b of the fixed cam member 26, as depicted in FIGS. 11A and 11B. In other words, in FIGS. 9D and 9E, the flat cam surfaces 33a of the movable cam member 27 slide and are abutted against the flat cam surfaces 30a of the fixed cam member 26. In this manner, when the flat cam surfaces 30a and 33a of the fixed cam member 26 and the movable cam member 27 are abutted against each other, an axial force to the tilt bolt 25 occurs.

At this time, as depicted in FIG. 2, since one end of the tilt bolt 25 is fixed to the right end side of the tilt bracket 22 by the nut 25b and the other end thereof has the head portion 25c formed thereat, a reaction force presses the fixed cam member 26 rightward and the clamping plate portion 21b of the right side of the tilt bracket 22 leftward. Due to this, the gap between the clamping plate portions 21b of the tilt bracket 22 is narrowed, thereby resulting in a locked state in which the distance bracket 23 is firmly retained therebetween.

In this manner, the present embodiment has employed the structure in which, in addition to the above-described embodiment, the four engagement portions for fixing the buffer member to the movable cam member are provided and fitted into the notch portions of the movable cam member. Accordingly, since each two of the engagement portions act on one buffer member, the outer ring portion is hardly twisted even when a load is applied to the buffer member by operation of the tilt lever. As a result of that, there can be provided a steering device that achieves higher operability, in addition to reduction of a hitting sound occurring upon release of clamping by the clamp mechanism.

While the steering device according to the present invention has been described above, the steering device according to the invention is not limited to the above embodiments, and various modifications can be made without departing from the gist of the invention. For example, although the above embodiments have provided the buffer member in the movable cam member, the buffer member may be provided in the fixed cam member or in each of the fixed cam member and the movable cam member. In addition, the second notch portions may be provided in the fixed cam member as in the movable cam member.

Additionally, the present invention can be also applied to a telescopic direction adjustment mechanism by changing the through-holes 23a of the distance bracket 23 in the aforementioned embodiment to long holes extending in a column axial direction. In other words, the present invention can be also applied to cases provided with only a tilt mechanism and case provided with only a telescopic mechanism, as well as those provided with both a tilt mechanism and a telescopic mechanism. Thus, the invention is applicable to steering column devices including positional adjustment functions such as a tilt function and a telescopic function.

While the present invention has been described with reference to the specific embodiments, it is not intended that the invention is limited by the description of the embodiments. With reference to the description of the invention, various modifications of the disclosed embodiments and other modifications of the invention are also apparent for those skilled in the art. It should be therefore understood that the scope of the claims also covers such modifications or embodiments included in the scope and gist of the invention.

REFERENCE SIGNS LIST

1: Steering device
2: Steering column
3: Steering shaft
4: Steering wheel
5: Universal joint
6: Universal joint
7: Intermediate shaft
9: Steering column
10: Lower bracket
11: Tilt pin
13: Tilt pin
20: Tilt mechanism
21a: Vehicle body-side attachment portion
21b: Clamping plate portion
22: Tilt bracket
22a: Tilt hole
23: Distance bracket
23a: Through-hole
24: Clamp mechanism
25: Tilt bolt
25a: Male screw portion
25b: Nut
25c: Head portion
26: Fixed cam member
26a: Cam protrusion-formed surface
26b: Stopper portion
26c: Notch portion
27: Movable cam member
27a: Cam protrusion-formed surface
27b: Stopper portion
27c: Notch portion
28: Tilt lever
28a: Square hole
28b: Insertion through-hole
29: Bolt through-hole
30: Cam protrusion
30a: Flat cam surface
30b: First inclined cam surface (back surface)
30c: Second inclined cam surface
31: Boss
32: Bolt through-hole
33: Cam protrusion
33a: Flat cam surface
33b: First inclined cam surface (back surface)
33c: Second inclined cam surface
34: Boss
45: Thrust bearing
46: Metal washer
50: Buffer member
51: Outer ring portion
51a: Engagement portion
51b: Fitting portion

The invention claimed is:

1. A steering device comprising:
a clamp mechanism including: a shaft rod bridged across a vehicle-body attachment bracket supporting a steering column; a fixed cam member and a movable cam member configured to cause mutually opposing cam protrusions to be engaged with each other, and axially move the shaft rod in cooperation with each other; and an operation lever for moving the movable cam member,
wherein a buffer member is provided between a plurality of first stopper portions protruding along a circumferential direction on an outer edge portion of a cam protrusion-formed surface on which the cam protrusions of the fixed cam member are formed and a plurality of second stopper portions protruding along a circumferential direction on an outer edge portion of a cam protrusion-formed surface on which the cam protrusions of the movable cam member are formed such that the second stopper portions are loosely fitted into first notch portions formed between the plurality of first stopper portions, the buffer member is connected to an outer ring portion that is fitted into an outer peripheral surface of at least one of the fixed cam member and the movable cam member.

2. The steering device according to claim 1, wherein the buffer member is interposed between the first stoppers and the second stoppers when operating the operation lever in a releasing direction so as to prevent contact between the first and second stoppers due to inertia generated upon release of the operation lever.

3. The steering device according to claim 1, wherein a plurality of second notch portions are provided on the outer peripheral surface of the at least one of the fixed cam member and the movable cam member, and a plurality of engagement portions are provided on an inner peripheral surface of the outer ring portion, each of the plurality of engagement portions being engaged with each of the plurality of second notch portions.

4. The steering device according to claim 1, wherein the buffer member is arranged point-symmetrically by 180 degrees with respect to a rotation center of the fixed cam member and the movable cam member.

5. The steering device according to claim 3, wherein the engagement portions in a state of engagement with the second notch portions are coincident with the cam protrusion-formed surface.

6. The steering device according to claim 3, wherein the engagement portions in a state of engagement with the second notch portions are higher than the cam protrusion-formed surface and smaller than a sum of gaps when the clamp mechanism is released.

7. The steering device according to claim 1, wherein the buffer member is made of synthetic resin and is integrally molded.

8. The steering device according to claim 3, wherein the engagement portions are arranged point-symmetrically by 180 degrees with respect to a rotation center of the fixed cam member and the movable cam member.

* * * * *